United States Patent [19]
Ershov et al.

[11] Patent Number: 6,061,129
[45] Date of Patent: May 9, 2000

[54] COMPACT HIGH RESOLUTION GRATING SPECTROMETER

[75] Inventors: Alexander I. Ershov; Gamaralalage G. Padmabandu, both of San Diego; Palash P. Das, Vista, all of Calif.

[73] Assignee: Cymer, Inc., San Diego, Calif.

[21] Appl. No.: 09/236,148

[22] Filed: Jan. 22, 1999

[51] Int. Cl.⁷ ........................................ G01J 3/18
[52] U.S. Cl. ........................................ 356/328
[58] Field of Search ........................... 356/328, 300, 356/305, 326, 331, 332, 334

[56] References Cited

U.S. PATENT DOCUMENTS

| | | | |
|---|---|---|---|
| 5,285,255 | 2/1994 | Baranne et al. | 356/328 |
| 5,589,717 | 12/1996 | Chau | 356/328 |
| 5,757,483 | 5/1998 | Pierce, III | 356/305 |
| 5,835,210 | 11/1998 | Eshov | 356/328 |

*Primary Examiner*—Frank G. Font
*Assistant Examiner*—Layla Lauchman
*Attorney, Agent, or Firm*—John R. Ross, Esq.

[57] ABSTRACT

A compact high resolution grating spectrometer. A beam of expanding light from a light source is collimated and the collimated beam is expanded with a beam expander before illuminating a reflecting grating. The expansion of the beam permits high resolution in a small package. In preferred embodiments mirror arrangements are provided to produce double reflections off the reflecting grating to further improve the resolution of the spectrometer.

12 Claims, 8 Drawing Sheets

COMPACT HIGH RESOLUTION GRATING SPECTROMETER

BACKGROUND OF THE INVENTION

Spectrometers are well known devices for measuring the intensity of light in a beam as a function of wavelengths. A typical spectrometer consists of a slit, a collimating lens, a dispersive optic, such as a prism, grating, or etalon (for angularly dispersing the spectral components according to wavelength), an objective lens or lenses for focusing the various wavelengths and a photometer for measuring the intensity of the various wavelengths. FIG. 1 is a schematic drawing of such a prior art spectrometer using a diffraction grating as a dispersive element. A light source 2 which is the subject of a wavelength measurement is sampled by an optical fiber 4 having an internal diameter of about 250 microns and a portion of the light is directed to slit 6 which is longer than the internal diameter of the fiber and has a width of about 5 microns. Light passing through slit 6 expands in the 5 micron direction (which is in the plane of drawing) in a beam 7 at an angle of about 3 degrees. The beam is reflected from mirror 8 and is collimated by lens 10 for illumination of grating 12 which in this prior art representation is arranged in a Littrow configuration. Light at various wavelengths reflecting from the grating is dispersed at angles dependant on the wavelengths. A beam representing only one wavelength or a very narrow range of wavelengths is depicted in FIG. 1 as reflecting from the grating 12 back through lens 10 and reflecting off mirrors 8 and 14 and is focused to a line at 15. (The long dimension of the line is into and out of the page.) This particular wavelength is refocused at a line 17 by objective lens 16. Light at this wavelength is measured by a photometer 18, while light at other wavelengths is blocked by a slit 19 placed in front of the photometer 18. Slit 19 and photometer 18 are placed in the same housing. Light at wavelengths other than the depicted wavelength (or very narrow range of wavelengths) is reflected off grating 12 at angles slightly different from that of the depicted beam. Thus, other wavelengths are measured at positions above or below line 17 by photometer 18 which, as indicated in FIG. 1, moves back and forth, together with slit 19, to make these intensity measurements. Photometer 18 may be a photo diode array in which case, it could provide a linear spectral representation of a narrow range of wavelengths in the reflected beam. If the light source has an effectively single range of wavelengths as compared to the resolution of the spectrometer, the line image depicted by the photo diode array will be representative of the resolution of that spectrometer.

The resolution of this prior art spectrometer is limited by dispersion of the grating and its size. Both of these parameters can only be improved up to a certain level determined by technology limits and cost. The resolution of the spectrometer can be improved by a factor of 2 by using a double pass arrangement according to U.S. Pat. No. 5,835,210, incorporated hereby by reference. In this arrangement, shown in FIG. 2, a partially reflecting mirror 20 having about 30 percent reflectivity, is inserted between lens 10 and grating 12. The mirror is positioned at a small angle to the beam directed from lens 10 toward grating 12.

The effect of partially reflecting mirror 20 is to reflect about 30 percent of the beam first from grating 12 back again onto grating 12 at a slightly different angle below the direction of the first beam. (About 70 percent of the light in the first reflection transmits partially reflecting mirror 20.) The reflected portion of the beam is reflected and dispersed a second time again returning to partially reflecting mirror where 70 percent of the second reflected beam transmits partially reflecting mirror 20.

This second reflected beam shown as 22 in FIG. 2, goes through lens 10 and reflects off mirrors 8 and 14, and is focused to the line at 24. The beam is refocused at a line 21 by objective lens 16. Light at this wavelength is measured by a photometer 18 in a way similar to FIG. 1. Light at wavelengths other than the depicted very narrow range of wavelengths is reflected off grating 12 at angles different from that of the depicted beam and, therefore, rejected by slit 19 similar to configuration of FIG. 1.

Because of double reflection off grating 12 in this configuration, the angular dispersion of light at different wavelengths will be approximately twice as large as in configuration of FIG. 1.

Therefore, the dispersion of this configuration is improved by a factor of 2, with other components being the same. Persons skilled in the art will recognize, that unfortunately, this scheme still has a disadvantage of having large size. The main limiting factor in size reduction is the focal length of lens 10, which has to be large in order to provide high dispersion. For example, in a prior art spectrometer manufactured by Cymer, Inc. (San Diego, Calif.) lens 10 has a focal length of about 1 m. Other spectrometers might have even larger focal lengths. The beam can be folded using mirrors 8 and 14 as shown in FIGS. 1 and 2 but the large focal length still has quite a limiting effect on size reduction. Another disadvantage is that for good performance, both lens 10 and mirrors 8 and 14 must be of very high optical quality which makes their cost to go up, especially for lens 10, since very high quality lenses can be very expensive.

Therefore, the prior art high quality spectrometer is a bulky and expensive instrument, which restricts their use in most cases to laboratory experiments. There is a need, however, for a high resolution compact spectrometer, which can be used in manufacturing process. A particular need exists for a compact high resolution ultraviolet spectrometer with a resolution of the order of 0.1 pm. Such a spectrometer is needed to monitor the output spectrum of narrow band excimer lasers used in deep UV microlithography. It is very important to make sure that the spectrum of the laser remains line-narrowed during deep UV microlithography. If the spectral bandwidth goes out of specification, the chromatic aberrations may blur the image of electronic components being printed on a silicon wafer and could cause production yield problems.

Therefore, what is needed is a compact spectrometer, which can be built in as a part of a laser or supplied as a field service tool, which is a compact, lightweight and capable of measuring laser spectrum with high resolution, on-line during micro lithographic chip manufacturing.

SUMMARY OF THE INVENTION

The present invention provides a compact high resolution grating spectrometer. A beam of expanding light from a light source is collimated and the collimated beam is expanded with a beam expander before illuminating a reflecting grating. The expansion of the beam permits high resolution in a small package. In preferred embodiments mirror arrangements are provided to produce double reflections off the reflecting grating to further improve the resolution of the spectrometer.

DETAILED DESCRIPTION OF THE PREFERRED EMBODIMENTS

First Preferred Embodiment

Figure 1:
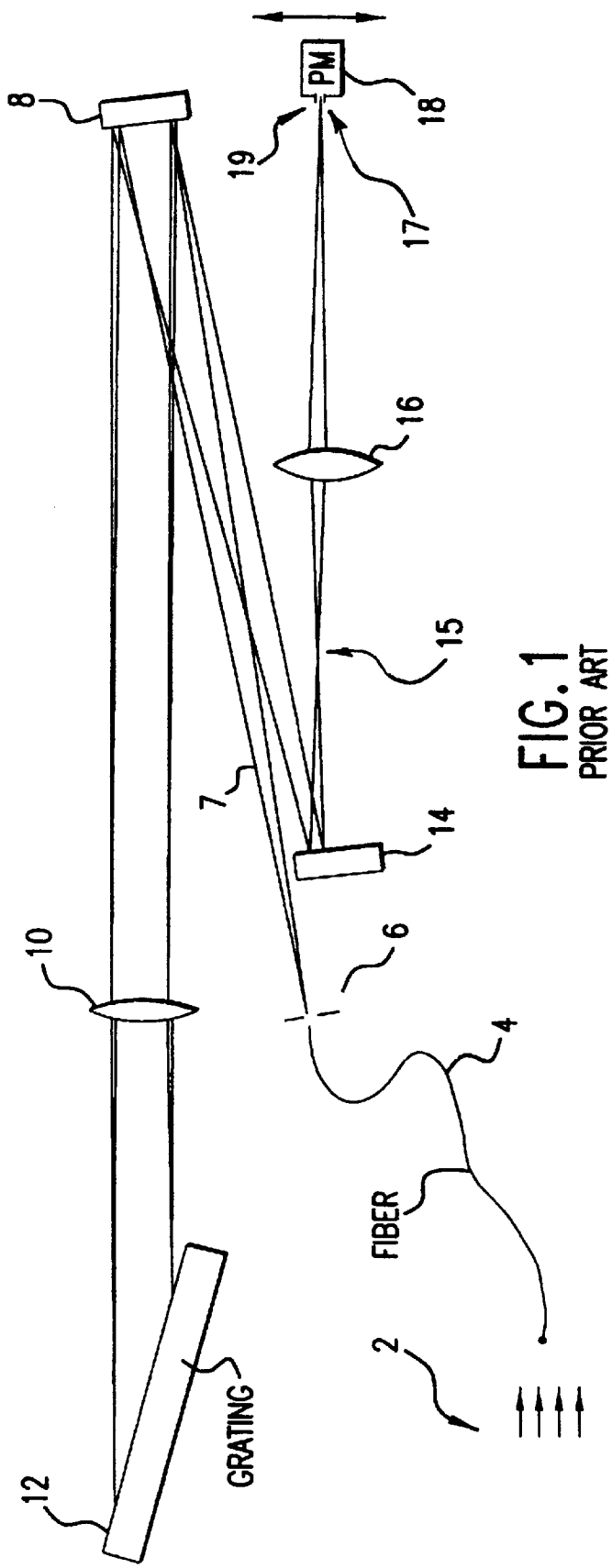
FIGS. 1 and 2 show prior art spectrometer configurations.
Figure 3:
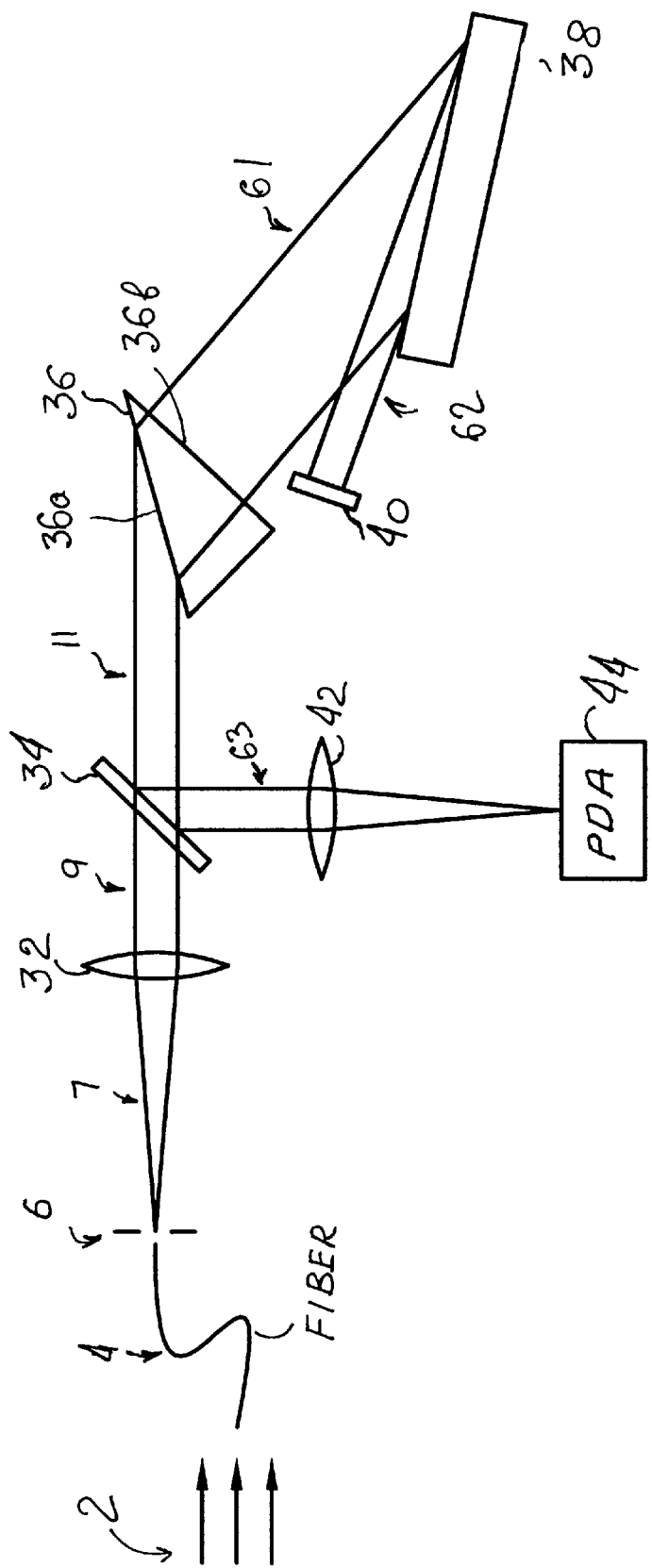
FIGS. 3, 4 and 5 are drawings of a preferred embodiment of the present invention.

FIG. 3 shows a preferred embodiment of the present invention. Light source 2 is sampled by optical fiber 4 and a portion of it is directed to slit 6 in a manner similar to the prior art arrangements. The optical fiber has a diameter of about 250 microns, and the slit has a width of about 5 microns and length of about 500 microns. Light passing through slit 6 expands in the 5 microns direction in a beam 7 at an angle of about 3 degrees. The beam is collimated by lens 32, which has a focal length of about 20 cm. This is about 5 times shorter focal length than that of the collimating lens 10 in the prior art arrangement of FIG. 1. Going back to FIG. 3, the collimated light beam 9 is incident on beam splitter 34, which has a reflection of about 50%. Approximately 50% of the light beam 9 transmits beam splitter 34 and continues to propagate as a collimated beam 11, while the other 50% of the light is reflected by beam splitter 34 away (this portion of the beam is not shown). Light beam 11 now goes through prism beam expander 36, which expands the beam in the 5 micron direction of the slit 6. In the preferred embodiment, the prism beam expander 36 consists of a single rectangular prism, with hypotenuse 36A being the entrance surface and positioned at an incidence angle of about 82 degrees to the beam 11. The apex angle between entrance surface 36A and exit surface 36B of the prism is about 45 degrees. The prism is made out of UV transparent material, such as fused silica, which has a good transmittance at 248 nm. The beam exits prism 36 at a small angle with exit surface 36B. Exit beam 61 is about 5 times wider, than entrance beam 11 in the 5 micron direction of the slit 6 and has about the same width in the opposite direction. Preferably, surfaces 36A and 36B have anti-reflection coatings which would reduce reflection losses and increases transmission of the prism beam expander.

Expanded beam 61 illuminates diffraction grating 62 at an angle of about 71 degrees. Its width in the direction of diffraction grating dispersion, which is the 5 micron direction of the slit 6, is about the same as the width of the prior art spectrometer. In this embodiment, grating 38 in an eschelle grating with 83 lines per mm available from suppliers such as Richardson Grating Laboratory, Rochester, N.Y. An incoming beam 61 with wavelength of 248 nm incident (onto the grating) at 71 degrees will be reflected at an angle of about 83 degrees to the grating. The grating is thus arranged in a non-Littrow configuration, that is the diffracted beam 62 does not propagate exactly opposite the incoming beam 61. As shown in FIG. 3, the diffracted beam 62 propagates at a larger angle to the grating (about 83 degrees) than the 71 degree angle of the incoming beam. This diffracted beam 62 is reflected back by a totally reflecting mirror 40 positioned perpendicular to beam 62, so it goes back to the grating on approximately the same path, as a diffracted beam 62. After striking the grating 38 for the second time, the diffracted beam propagates back on a path close to the same path as original beam 61, goes through prism 36, and is partially reflected by the beam splitter 34. This diffracted beam 63 is focused by a lens 42 onto 2048 pixels linear photodiode array 44.

Light with slightly different wavelengths is reflected by grating 38 in slightly different directions depending on the wavelength. Therefore, the light with different wavelengths will be focused on different parts of the array 44, which contains 2048 photo detectors, each of them is about 14 microns wide. In the preferred embodiment, the focal length of the lens 42 is about 40 cm which creates about 2× magnification of the slit entrance image. Linear photo diode arrays such as array 44 are available from suppliers such as EG&G Reticon with offices in Sunnyvale, Calif.

Figure 2:
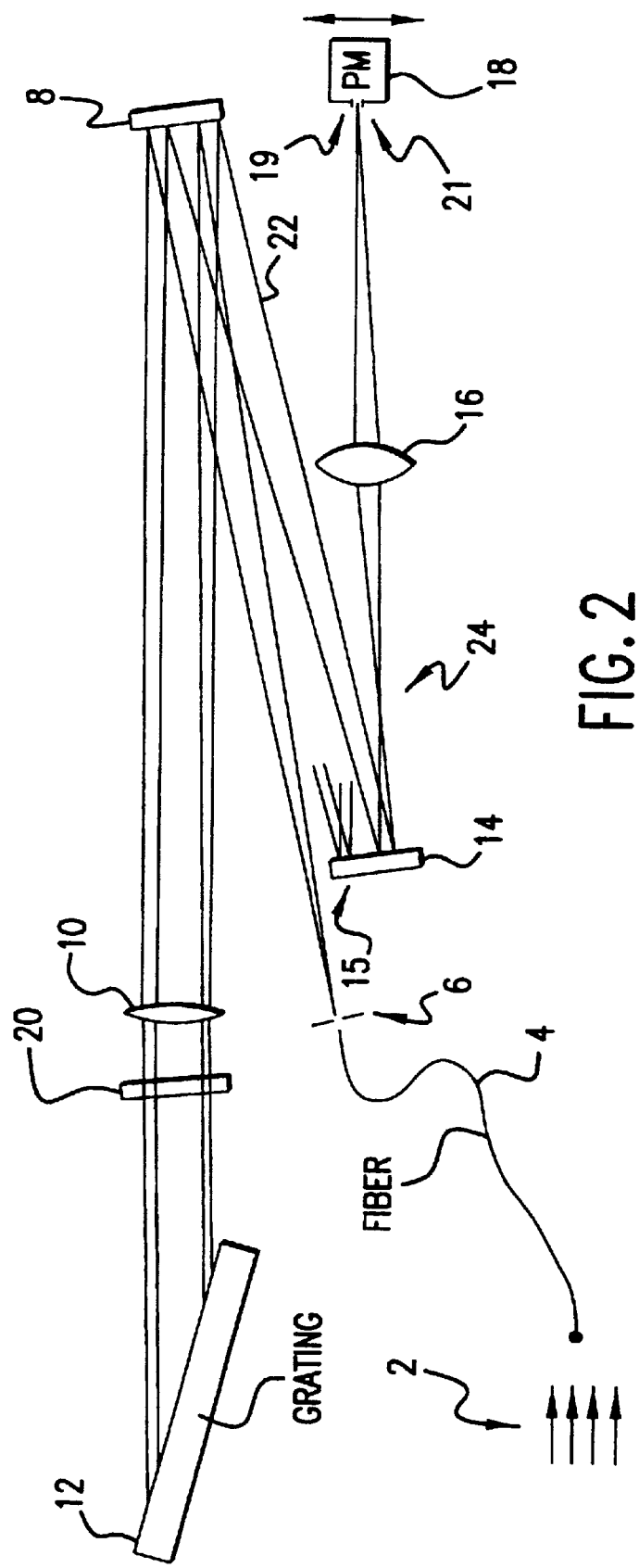
Figure 6:
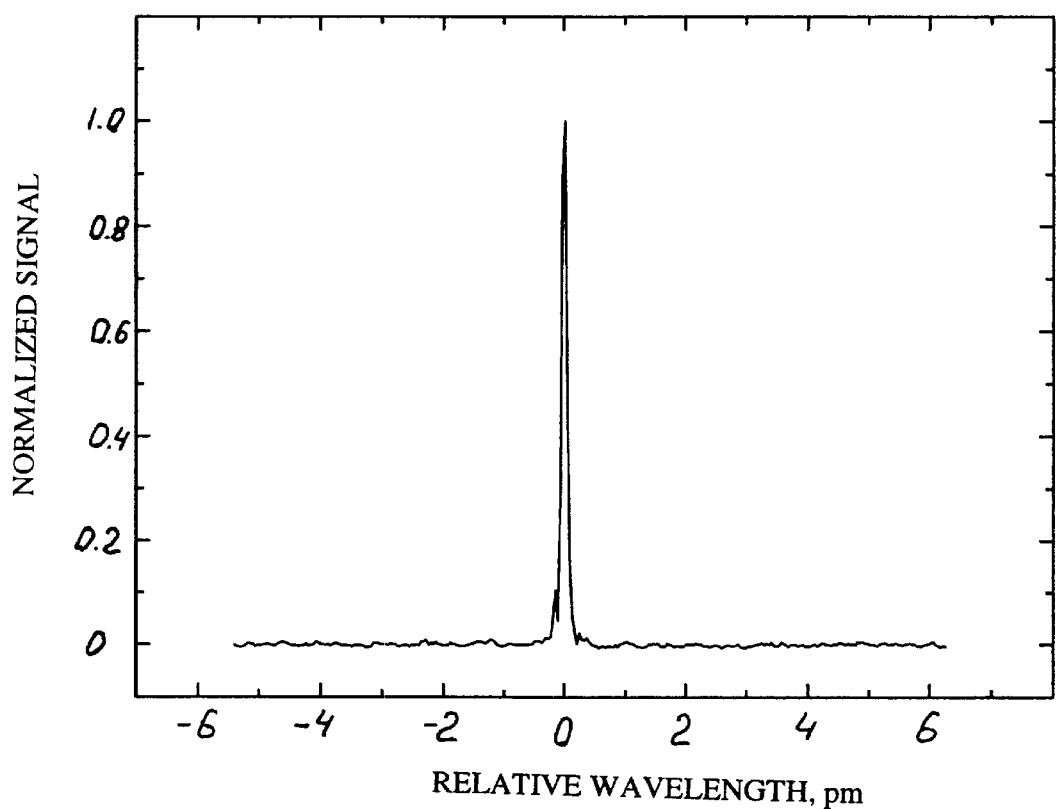
FIG. 6 is a graph showing the spectrum of an Ar-ion laser as measured by the FIG. 3 embodiment.

The resolution of the spectrometer of the present invention has been tested by authors using frequency doubled Ar-ion cw laser. This laser emits a light at 248.25 nm with extremely narrow spectral bandwidth, i.e., only about 0.003 pm (FWHM). FIG. 6 shows a sample of the spectrum of this laser measured with the spectrometer of the present invention. The measured resolution of the spectrometer was about 0.11 pm, which is as good or even better than the resolution of the prior art FIG. 2 spectrometer. However, the spectrometer of the present invention is about 3 times smaller, as it does not use a very long optical path for entrance and exiting beam as required by prior art spectrometer to achieve the required resolution.

Figure 7:
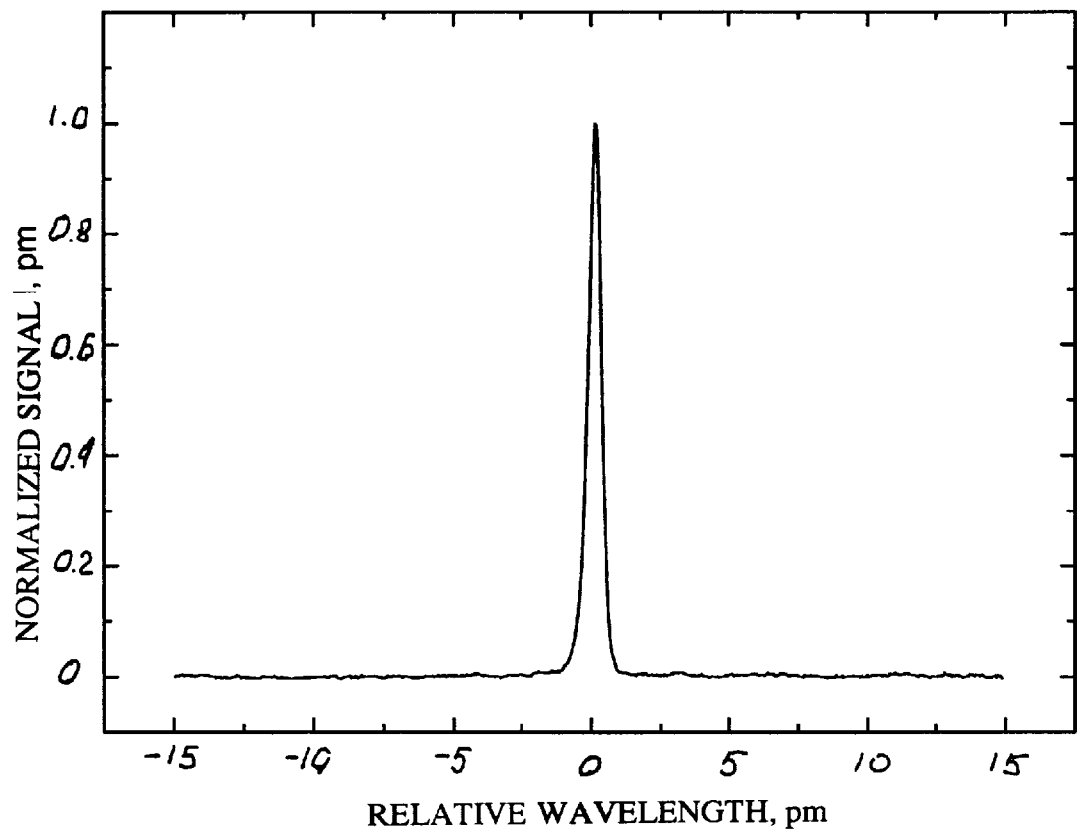
FIG. 7 shows the spectrum of a KrF laser as measured with the FIG. 3 embodiment.

FIG. 7 shows a spectrum of pulsed KrF excimer laser used for microlithography, measured with the new spectrometer. Because a photodiode array is used to analyze the spectrum, a "single shot" spectrum measurement is possible. This spectrometer can be installed inside the laser and continuously monitor laser spectrum during wafer exposures. The single shot spectrum can be measured as well as the integrated spectrum of the burst of pulses. The choice of how many pulses are used to measure spectrum might be determined by a kind of microlithography exposure system. For example, in "step-and-repeat" systems, which expose a complete die with a burst of pulses, the spectrum of the whole burst can be measured. In "step-and-scan" systems, when a die is exposed using a moving window of light, the integrated spectrum of the pulses used to expose the window can be used.

Second Preferred Embodiment

Figure 4:
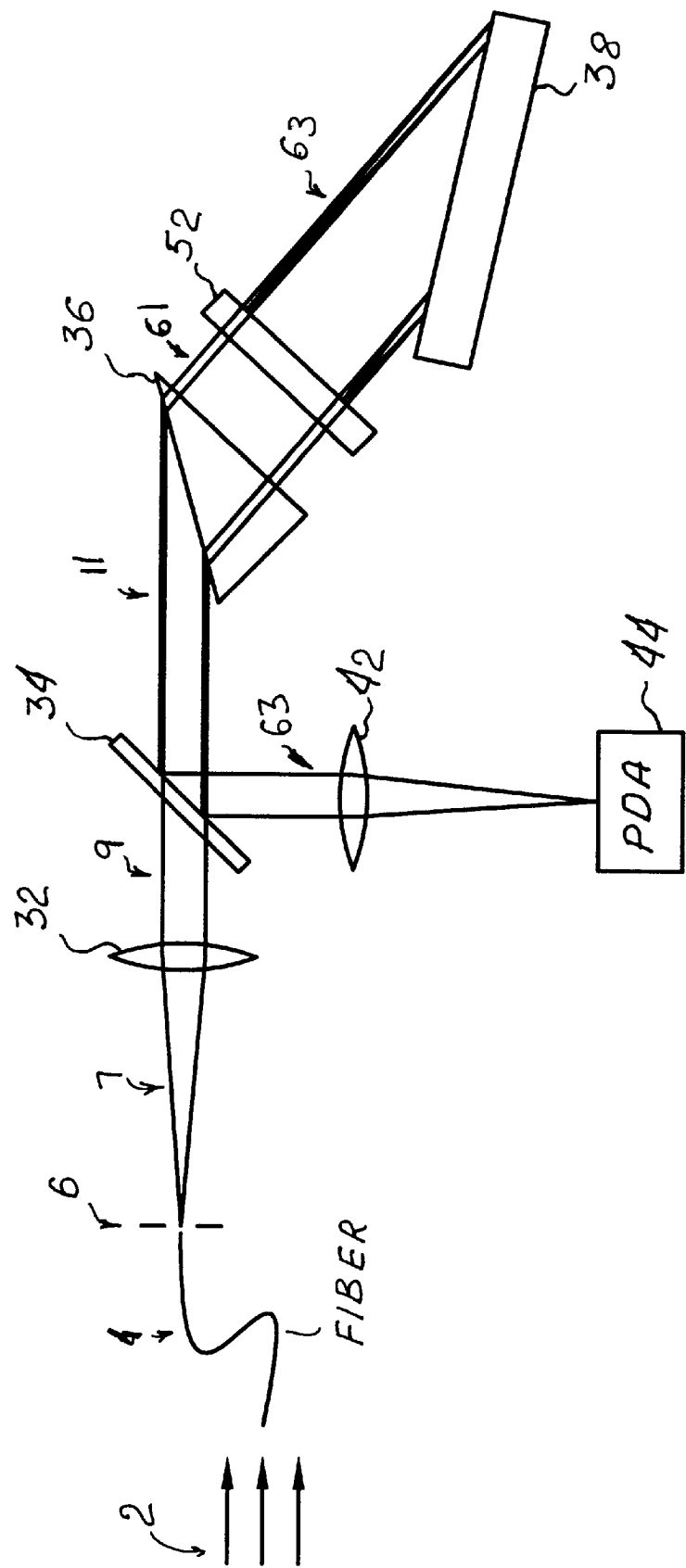

A second embodiment of the present invention is shown in FIG. 4. In this embodiment, a Littrow configuration for diffraction grating 38 is used. In this embodiment, a partially reflecting mirror 52 is inserted between the prism beam expander 36 and the grating 38 in order to create a double pass of light on the grating. The mirror 52 is tilted slightly by an angle of about 0.034 degrees in the plane of dispersion of the diffraction grating 38 (plane of the drawing). The mirror 52 has a reflectivity of about 30%. A light beam 61 after expansion by prism 36 transmits through mirror 52 and illuminates grating 38. After reflection off of grating 38 in the direction approximately opposite the incidence beam (In the Littrow configuration the same grating described for the first embodiment is mounted at about 78 degrees to the incoming and reflected beams), the reflected beam illuminates mirror 52. Some portion of the beam goes through the mirror, but the rest is reflected back to the grating for the second time. After second reflection, about 70 percent of the double dispersed light goes through mirror 52, prism 36 and is reflected by beam splitter 34 as a beam light 63. This light is focused by a lens 42 onto photodiode array 44 in a similar way as in the first embodiment of the present invention and the spectrum is detected by photo diode array 44. The partially reflecting mirror 52 creates a double reflection of the light on the grating just as a mirror 40 does in the first embodiment (FIG. 3). The first reflection from grating 38 will create a beam which will be focused on photo diode array 44 at a different spot.

Figure 8:
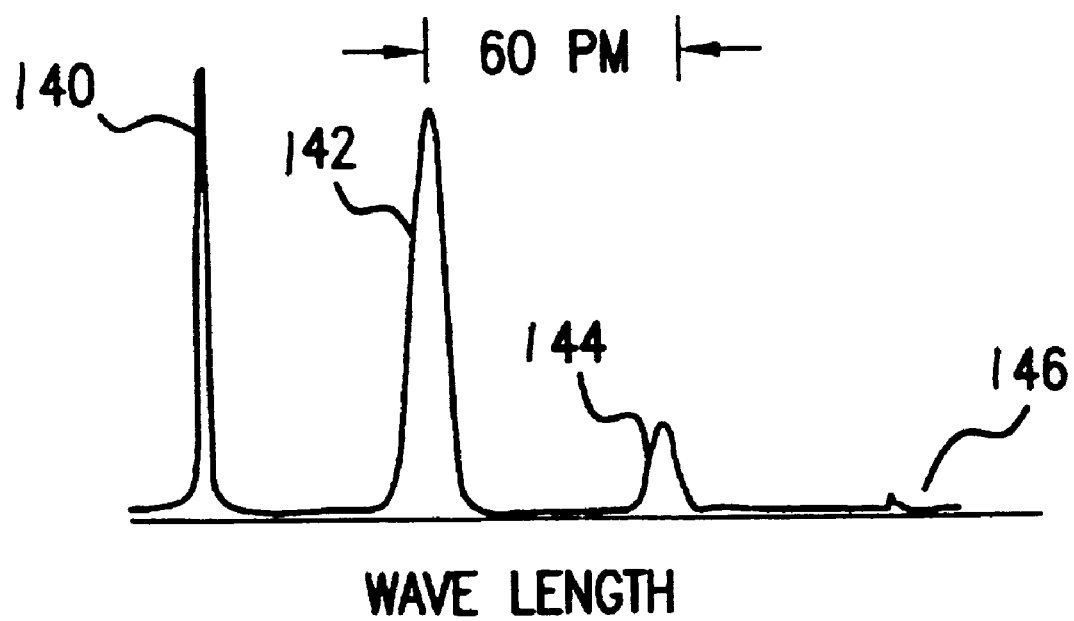
FIG. 8 shows measurements with the FIG. 4 embodiment.

FIG. 8 shows peaks which can be detected by the photo diode array.

The first peak 140 represents light reflected off mirror 52 which never reaches grating 38. This first peak can be disregarded. The second peak 142 represents light reflected once off grating 38. This peak can be used as a reference. It can be used for spectrum measurements as well, but the resolution of the spectrometer is 2 times smaller. The third peak 144 represents light reflected twice off grating 38 and typically would provide the best spectral accuracy and the resolution corresponding to a double-pass configuration. The fourth peak 146 represents light reflected three times off grating 38 and may provide even better data but only if sufficient light is available. For the particular configuration described above, the distance between two adjacent peaks correspond to a spread in wavelength of about 60 pm.

The range covered by a photodiode array 44 (having 2048 detectors spread over a length of about 286 mm) is about ±30 pm, so it can be used to record two adjustment peaks. The position of the PDA can be adjusted to record additional peaks. (The typical FWHM bandwidth of a lithography excimer laser is about 1–3 pm, so the bandwidth would be smaller than the bandwidth of the peaks represented in FIG. 8, which would indicate a bandwidth of about 9 pm.)

Third Preferred Embodiment

Figure 5:
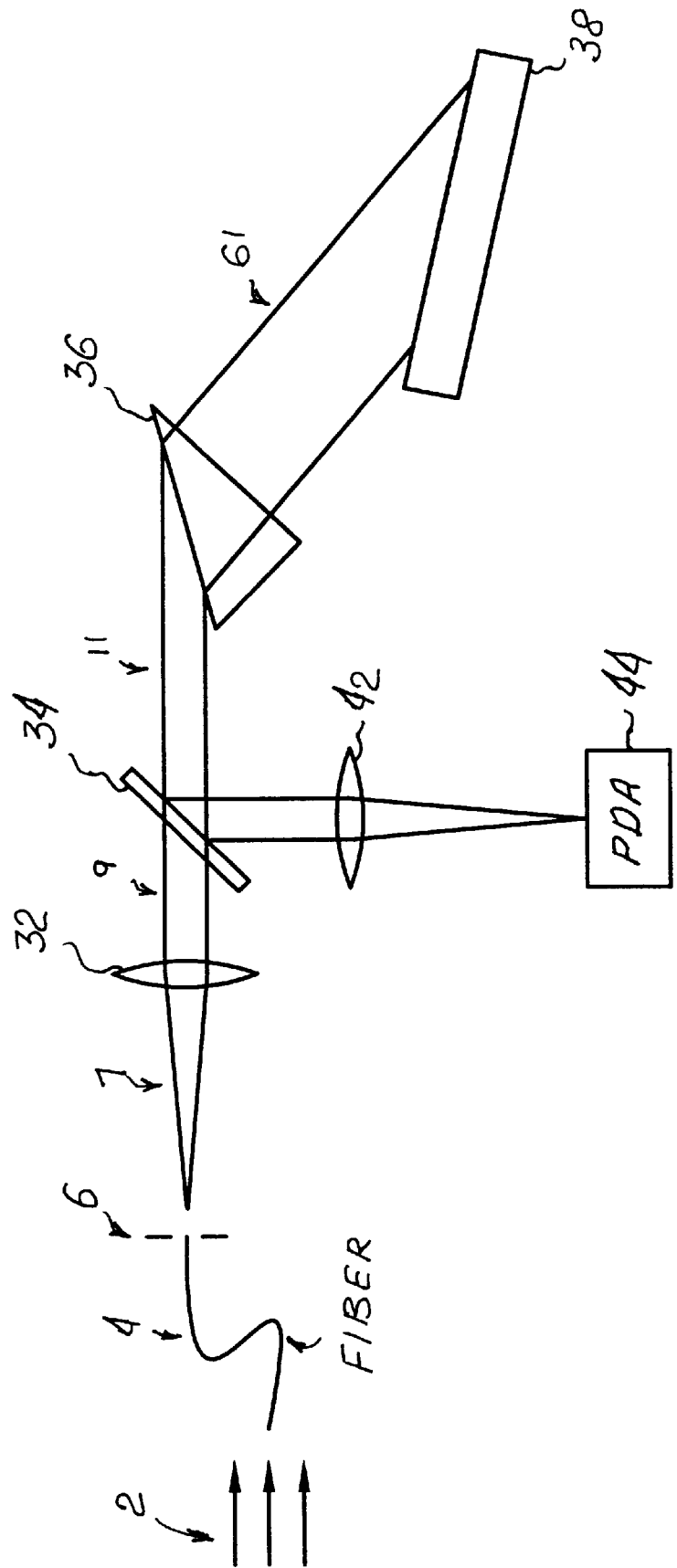

A third embodiment of the present invention is shown in FIG. 5. In this case a single pass Littrow configuration is used. Thus, an expanded beam light 61 illuminates grating 38 and reflects approximately back. After going through prism 36 and reflection off of beam splitter 34, this light is focused by lens 42 onto photodiode array 44. If the similar components are used, this embodiment provides approximately 2 times coarser resolution than spectrometers of first and second embodiment but has a benefit of simplicity and smaller signal losses.

Persons, skilled in the art can recognize that other modifications can be done without departing from the spirit of the present invention. For example, a scanning exit slit and a photometer can be used instead of photodiode array if fast response is not a requirement. This slit-photometer assembly can scan the area of the PDA and measure the light intensity at different wavelengths. Therefore, the invention is only to be limited by the claims and their legal equivalents.

What is claimed is:

1. A spectrometer for measuring intensity of light in a light source at various wavelengths comprising:
    A) a beam expansion optic for producing an expanding beam from said light source;
    B) a reflecting grating;
    C) a collimating optic for collimating said expanding beam from said light source to produce a first collimated beam;
    D) a beam expander for expanding said first collimated beam to produce a second collimated beam for illumination of said reflecting grating;
    E) a photometer for measuring light intensity in light reflected from said reflecting grating at a plurality of spacial locations.

2. A spectrometer as in claim 1 wherein said reflecting grating is configured in a Littrow configuration wherein a beam constituting a selected portion of said second collimated beam is reflected back through said beam expander and contracted by said beam expander.

3. A spectrometer as in claim 1 and further comprising a focusing lens and a partially reflecting mirror positioned between said collimating optic and said beam expander for directing at least a portion of light reflected from said reflecting grating through said focusing lens to said photometer.

4. A spectrometer as in claim 2 and further comprising a focusing lens and a partially reflecting mirror positioned between said collimating optic and said beam expander for directing at least a portion of light reflected from said reflecting grating through said focusing lens to said photometer.

5. A spectrometer as in claim 1 and further comprising a mirror positioned:
    a) to intersect, approximately perpendicularly, light at a selected range of wavelengths reflected from said reflecting grating and
    b) to reflect back to said reflecting grating light at said selected range of wavelengths, wherein light at said selected range of wavelengths is reflected twice from said grating then passes back through said beam expander.

6. A spectrometer as in claim 1 wherein said reflecting grating is configured in a Littrow configuration and further comprising a mirror with a partially reflecting surface positioned in between said beam expander and said grating and aligned approximately but not exactly perpendicularly across said second collimated beam so that a light within a selected range of wavelength is reflected twice from said reflecting grating.

7. A spectrometer as in claim 1 wherein said beam expanding optic is a slit.

8. A spectrometer as in claim 1 wherein said collimating optic is a lens.

9. A spectrometer as in claim 1 wherein said photometer is a linear photo diode array.

10. A spectrometer as in claim 1 wherein said photometer is a movable photo detector.

11. A spectrometer for measuring intensity of light in a light source at various wavelengths comprising:
    A) an entrance slit for producing an expanding beam from said light source;
    B) a reflecting grating;
    C) a collimating optic for collimating said expanding beam from said light source to produce a first collimated beam;
    D) a beam expander for expanding said first collimated beam to produce a second collimated beam for illumination of said reflecting grating;
    E) a maximum reflection optic, positioned, along with said reflecting grating, to reflect back to said reflecting grating light at a selected range of wavelengths reflected from said reflecting grating at an angle such that light at the selected range of wavelength will pass back through said beam expander and exit said beam expander along a path generally opposite a path defined by said first collimated beam;
    F) a photo diode array for measuring light intensity in light reflected from said reflecting grating at a plurality of spacial locations;
    G) a focusing lens positioned for focusing light on to said photo diode array; and H) a beam splitter positioned across said first collimated beam to reflect light-reflected back through said beam expander to said photo diode array.

12. A spectrometer for measuring intensity of light in a light source at various wavelengths comprising:

A) an entrance slit for producing an expanding beam from said light source;

B) a reflecting grating;

C) a collimating optic for collimating said expanding beam from said light source to produce a first collimated beam;

D) a beam expander for expanding said first collimated beam to produce a second collimated beam for illumination of said reflecting grating;

E) a partially reflecting mirror positioned across said second collimated beam and positioned, along with said reflecting grating to reflect back to said reflecting grating light at a selected range of wavelengths such that a portion of the light at said selected range of wavelengths will reflect a second time from said reflecting grating then pass through said partially reflecting mirror and back through said beam expander and exit said beam expander in a direction generally opposite a path defined by said first collimated beam;

F) a photo diode array for measuring light intensity in light reflected from said reflecting grating at a plurality of spacial locations;

G) a focusing lens positioned for focusing light on to said photo diode array; and H) a beam splitter positioned across said first collimated beam to reflect light-reflected back through said beam expander to said photo diode array.

* * * * *